United States Patent [19]
Wells

[11] 3,809,023
[45] May 7, 1974

[54] ROTARY INTERNAL COMBUSTION ENGINE

[76] Inventor: William T. Wells, 1750 W. Ajo Way, Tucson, Ariz. 85713

[22] Filed: Aug. 3, 1972

[21] Appl. No.: 277,736

[52] U.S. Cl................ 123/8.27, 123/8.41, 418/244, 418/248
[51] Int. Cl............................................ F02b 53/08
[58] Field of Search................ 123/8.23, 8.27, 8.41; 418/244, 248

[56] References Cited
UNITED STATES PATENTS

| | | | |
|---|---|---|---|
| 1,605,912 | 11/1926 | Barker | 123/8.23 |
| 992,096 | 5/1911 | Wright | 123/8.41 |
| 1,131,072 | 3/1915 | Morin | 123/8.41 |
| 1,235,786 | 8/1917 | Fleming | 123/8.41 |
| 1,366,919 | 2/1921 | Marvin | 123/8.41 |
| 2,048,825 | 7/1936 | Smelser | 123/8.27 |
| 2,196,675 | 4/1940 | Humrichouse | 123/8.41 |
| 2,762,346 | 9/1956 | White | 418/248 |
| 3,361,119 | 1/1968 | Conolly | 123/8.22 |

Primary Examiner—C. J. Husar
Attorney, Agent, or Firm—H. Gordon Shields

[57] ABSTRACT

A rotary internal combustion engine is disclosed which includes separate members for compressing a gaseous mixture and for deriving power from the combustion of the gaseous mixture.

14 Claims, 12 Drawing Figures

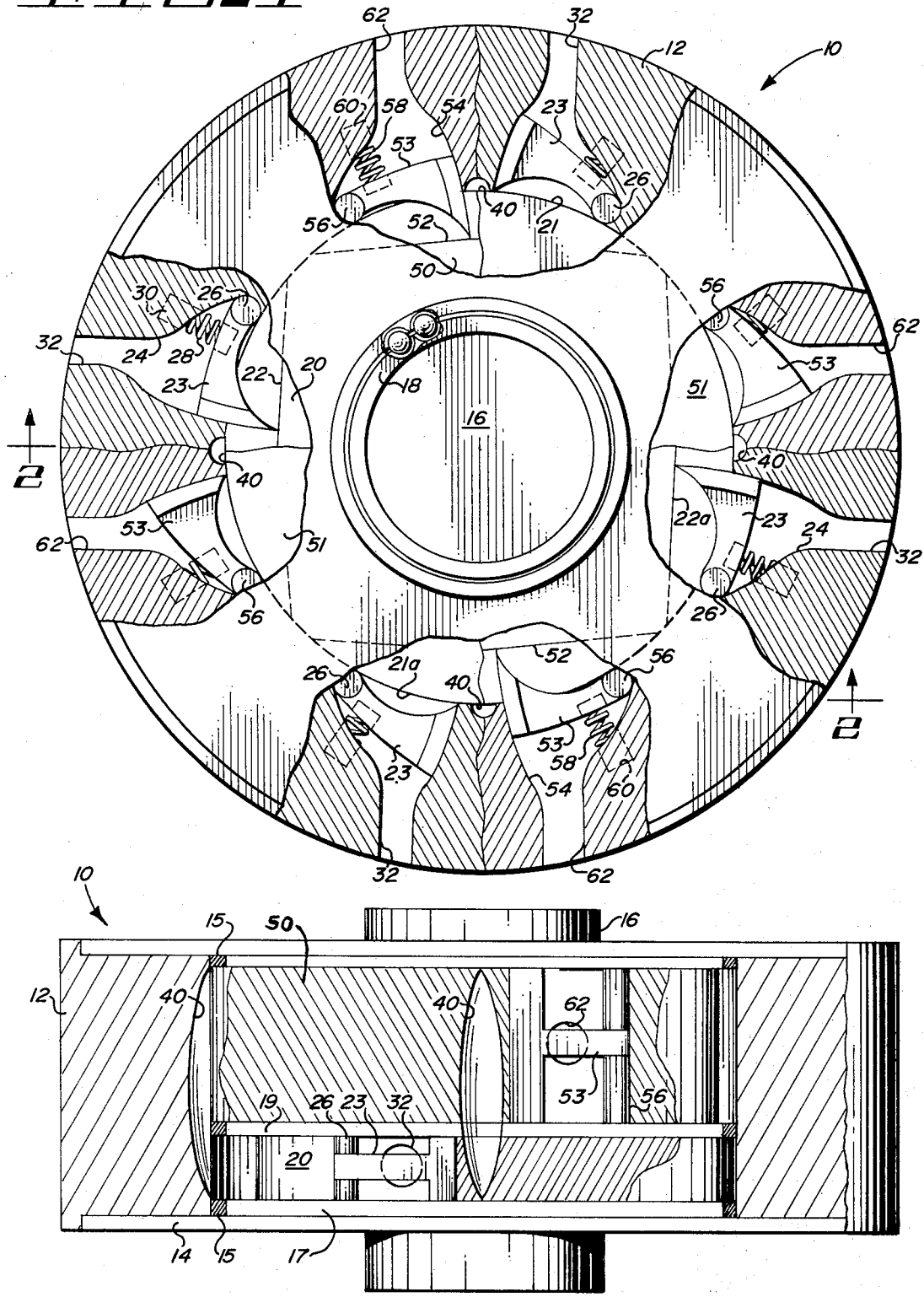

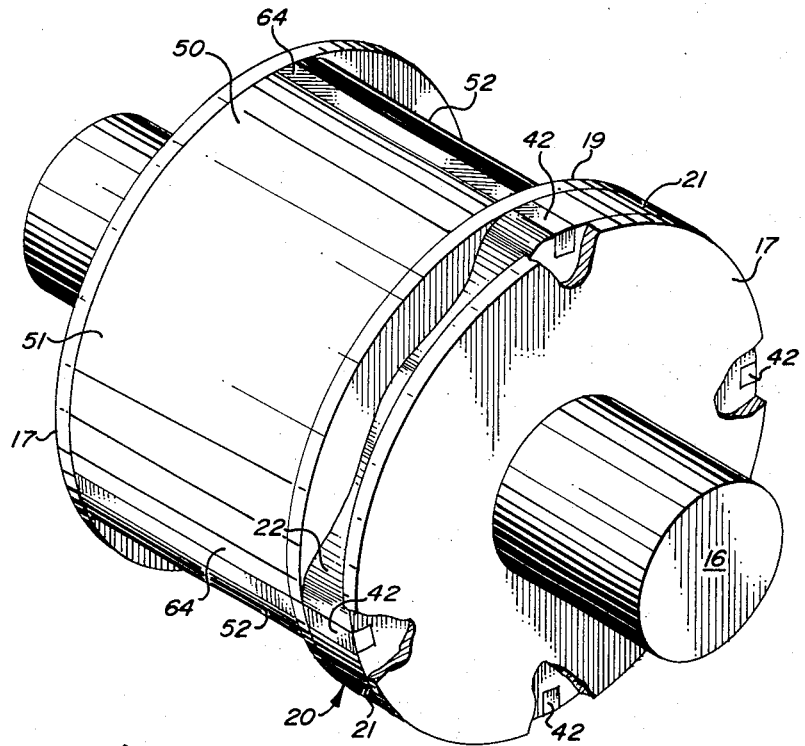
Fig-3
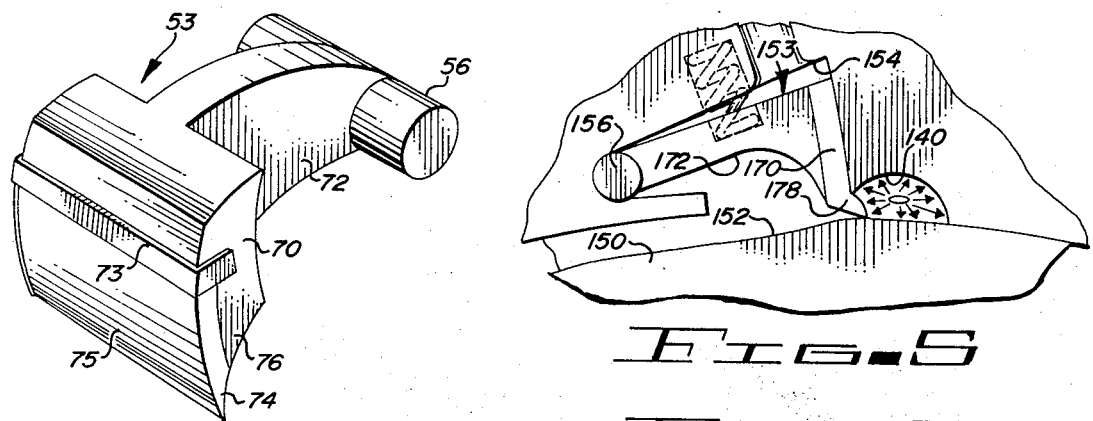
Fig-4
Fig-5
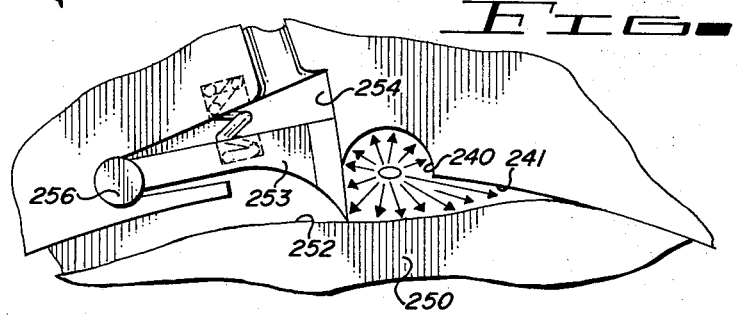
Fig-6

३,८०९,०२३

ROTARY INTERNAL COMBUSTION ENGINE

BACKGROUND OF THE INVENTION

1. Field of the Invention

This invention relates to internal combustion engines, and, more particularly, to rotary internal combustion engines in which a pair of rotors is used, one for compressing a gaseous mixture or charge and a second rotor for deriving power from the ignition of the gaseous mixture. The two rotors are keyed together on the same shaft.

2. Description of the Prior Art

It is generally recognized that the internal combustion engine was developed about 1885. Since that time, there have been numerous designs for internal combustion engines, the most common of which is the piston engine in which pistons reciprocate within a cylinder and the motion of the pistons, transmitted through piston rods to a shaft, imparts rotary motion to the shaft. Normally, when one thinks of an internal combustion engine, one thinks of the reciprocating engine. Typically, this engine is a four stroke engine, in which a charge is inducted into the engine, is compressed, the compressed charge is then ignited, and the ignition or combustion of the charge then produces a power stroke. At the end of the power stroke the burnt charge is then exhausted from the cylinder and a fresh charge is introduced, which then continues the cycle of intake, compression, power, and exhaust. In addition, there are two stroke engines in which the charge is simultaneously introduced into the engine and compressed for one stroke, and then ignited to produce, also substantially simultaneously, a power and exhaust stroke. However, the four stroke cycle engine is the most popular today and is responsible for providing motive power for a majority of the automobiles, and other wheeled vehicles, common on today's streets and highways.

Over the years there have been other types of engines developed which use the four stroke cycle but which are termed rotary engines. Basically, there are two kinds of rotary engines, one in which a number of pistons and cylinders extend radially from a central shaft and the cylinders rotate about the shaft while the pistons reciprocate within the cylinders. The second type of rotary engine is sometimes termed a rotary combustion chamber engine in which the combustion chamber, with its gaseous charge, rotates about a shaft. In the latter type, a central rotor is normally used, with either an eccentric motion about a shaft or else a camming surface or surfaces on the rotor, to produce the desired compression of a charge and also thus provide impulse to the rotor to provide an output therefrom.

Recently, within the last decade, an improvement in the latter type of engine has become increasingly popular. However, the engine has limitations because of the eccentricity of the rotor and also of the bearing and internal gearing structure of the rotor. The rotor, in order to describe the proper movement within the stator, requires a triangular piston and an internal configuration of the stator termed "epitrochoidal." Since the rotor describes an eccentric path within the stator, the gearing between the rotor or piston and the shaft is also eccentric with respect to the forces there between.

In addition to the types of engines discussed above, there are also internal combustion engines which operate on the Diesel cycle, in which the fuel is not mixed with the air prior to the intake stroke and to compression, but rather is injected into the engine after an air charge has been compressed. The injection of the fuel into the compressed air results in combustion taking place without the requirement of a spark plug. In a typical Diesel engine, the compression ratios are considerably higher than in a normal internal combustion engine in which a fuel air mixture is introduced into the engine, is compressed, and then ignited by a spark plug.

SUMMARY OF THE INVENTION

The present invention comprises a rotary internal combustion engine in which a pair of rotors are secured together to a shaft and one of the rotors is used to compress a charge and the other rotor is used after the ignition of the charge to transmit power from the combustion of the charge to the shaft to which the rotors are affixed. The engine permits an incoming charge to be efficiently compressed and then utilized during and after combustion to a maximum extent with respect to deriving complete power from the burning gases. Accordingly, there are more power pulses or impulses per revolution of the drive shaft than is otherwise obtainable from contemporary reciprocating engines. A valve system is eliminated by the use of intake and exhaust ports, and the lever arm of power impulses transmitted to the drive shaft by combustion of the charge is an order of magnitude or more greater than for comparable reciprocating piston engines. Moreover, the rotating members of the engine are symmetrical, thus eliminating balancing problems and bearing problems.

Among the objects of the present invention are the following:

to provide a new and useful internal combustion engine;

to provide a new and useful rotary internal combustion engine;

to provide a new and useful internal combustion engine having symmetrical rotating members;

to provide a new and useful internal combustion engine having a separate compression member and a separate power transmission member;

to provide a new and useful internal combustion engine having a plurality of camming surfaces on rotating compression and power members; and to provide a new and useful internal combustion engine having a rotating combustion chamber.

BRIEF DESCRIPTION OF THE DRAWING

FIG. 1 is a side view in partial section of the apparatus of the present invention.

FIG. 2 is a vertical view in partial section taken along line 2—2 of FIG. 1.

FIG. 3 is an isometric view of a portion of the apparatus of the present invention.

FIG. 4 is an isometric view of a cam follower utilized in the present invention.

FIG. 5 is a view of an alternate embodiment of a cam follower.

FIG. 6 is an alternate embodiment of a combustion chamber of the present invention.

DESCRIPTION OF THE PREFERRED EMBODIMENT

Figure 7:
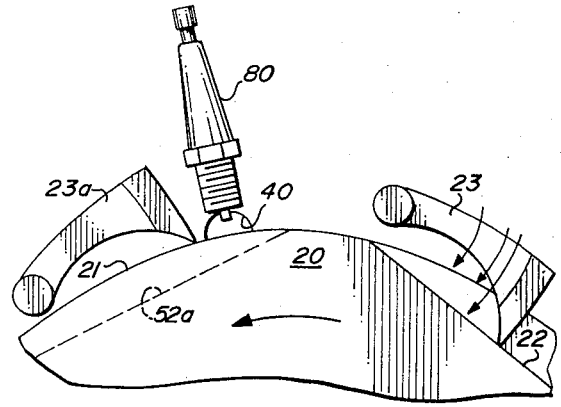
FIGS. 7–12 are successive views illustrating the operation of the apparatus of the present invention.

FIG. 1 discloses a rotary internal combustion engine embodying the present invention. The figure is in partial section showing the radial relationship of the various components comprising the rotary internal combustion engine. The internal combustion engine 10 includes a block assembly or stator 12 which is closed by a pair of end cover plates 14. Within the block assembly 12 are a pair of rotors, compression rotor 20 and power rotor 50. The rotors are keyed together on a shaft 16. Each of the rotors includes a diametrically opposed pair of full radius cams 21 and 51, each of which extends arcuately for a distance of about 90°. The other portions of each cam, also diametrically extending over an arcuate distance of about 90°, comprise a pair of configured depressions or recesses 22 and 52. The rotors are aligned in such a manner that a configured depression of one cam is adjacent the full radius portion of the other rotor, with a few degrees of overlap of the full radius portions of the rotors.

The rotors, secured to shaft 16, are appropriately journalled for rotation within the block assembly or stator 12 and the end cover plates 14 by bearings 18. In the following description the rotors and shaft 16 will be assumed to be rotating clockwise as viewed in FIG. 1, as indicated by an arrow.

Each of the rotors has four cam followers located about 90° from each other in a spaced apart relationship about the periphery of the rotors. The cam followers for the compression rotor are spaced apart in a leading relationship with respect to the adjacent cam follower for the power rotor. That is, there is a leading-lagging relationship between adjacent followers for the respective rotors. In the following discussion the cam followers will be referred to as "compression followers" and "power followers" to differentiate one from the other with respect to the particular rotor to which each pertains.

As viewed in FIG. 1, the compression rotor 20 includes diametrically opposite full radius cam portions 21 and 21a, in the 12:30 and 6:30 positions, and cam recesses 22 and 22a in the 9:30 and 3:30 positions. The cam recesses or depressions are configured substantially identical to each other, as previously indicated. A compression cam follower 23 is located within a well 24 in block assembly 12 at each of four locations spaced apart 90° from each other. In FIG. 1, the compression followers 23 and the wells 24 for the compression rotor are located at the 12:30, 3:30, 6:30, and 9:30 positions, with each of the followers bearing against the adjacent portion of the rotor. In the 12:30 and 6:30 positions, the compression followers are fully nested within their respective wells while bearing against the full radius cams 21. In the 3:30 and 9:30 positions, the compression followers are extended substantially to their full out position against the cam recesses 22.

Each of the compression followers are of substantially the same design and configuration. They pivot about a self contained pivot pin 26 which nests within a complimentary fitting recess in each well 24. Each of the compression followers are biased radially inwardly against the compression rotor by a compression spring 28. The compression springs 28 are located in spring recesses 30 in the block assembly 12 and they extend between the spring recesses 30 and their respective compression followers 23. The compression followers include seals which bear against the surface of the well in which they are disposed and against the adjacent side walls or sealing members between the rotors. The followers also bear against the rotors. The specific design configuration of the compression followers and of the power followers, which are both similar in design, will be discussed in more detail below.

Above each of the followers, and communicating with the respective wells and the rotors, are a plurality of intake ports 32. The intake ports extend through the block assembly 12. The intake ports may each communicate with charge forming apparatus, such as a carburetor or fuel injection apparatus.

As compression rotor 20 rotates on shaft 16, a gaseous mixture or charge is inducted through an intake port 32 and through a well 24 past compression follower 23 as the full radius cam portion 21 of the rotor moves past a compression follower to expose a leading portion of a cam recess 22. The compression follower 23 seals the rotor behind the leading portion of the cam recess to prevent the escape of the incoming charge behind the compression follower. Thus the charge is drawn into the cam recess as the rotor moves past the well and the intake port. The juncture of the full radius portion of the cam and the cam recess is sealed, as will be discussed below, against the interior periphery of the block assembly 12 so as to prevent the charge from escaping forward of the cam recess.

The terms "leading" and "trailing" refer to various portions of the rotors in the direction of rotation. They refer to the portions of the rotors as they move past a part of the stator, such as a particular port or follower.

The rotor continues to move forward until the next following full radius cam portion of the rotor moves against the compression follower 23 so as to complete the intake portion of the cycle. As rotation continues, the leading portion of the cam recess 22 then moves forward until the trailing edge of the next forward compression follower 23 moves into the leading edge of the cam recess 22. The charge is then compressed between the compression follower and the trailing edge of the cam recess as the compression rotor continues to rotate. When the trailing edge of the cam recess moves to the compression follower the charge is completely compressed into a compression-combustion chamber 40 extending between and communicating with the compression rotor and the adjacent power rotor on the inner periphery of the stator. During the compression portion of the cycle the compressing charge is moved or compressed into the compression-combustion chamber. Thus at the time when the next following or succeeding full radius cam portion 21 of the compression rotor, i.e., the full radius portion adjacent the lagging or training portion of the recess, presents itself to the next forward compression follower, the compression of the charge is completed and the charge is compressed into the compression-combustion chamber 40.

During the compression portion of the cycle the full radius cam portion of the adjacent power rotor presents itself to the power rotor end of the compression-combustion chamber 40 thus preventing the escape of the compressing charge.

The power rotor portion of the engine 10 is substantially the same as the compression portion of the engine except that the power rotor cams are, as has been mentioned, displaced 90° from the adjacent portions of the compression rotor. That is, the full radius cam portions of the power rotor are disposed adjacent the cam recess portions of the compression rotor and vice versa. Moreover, the power followers are oriented in the reverse manner with respect to the compression followers such that the respective adjacent followers "face" each other.

The power rotor 50 includes a pair of full radius cam portions 51 diametrically opposite each other and each extends over an angular distance of about 90°. Also diametrically opposite to each other, and also extending for a distance of about 90° are a pair of cam recesses 52. In FIG. 1, the full radius cam portions are illustrated in the 2:30 and 8:30 positions and the cam recess portions 52 are shown at the 5:30 and the 11:30 positions.

Four power followers 53 are shown bearing against the adjacent portion of the power rotor. The power followers 53 extend into their respective wells 54 and each of them pivots on a pivot pin 56. The pivot pins 56 are disposed in appropriate recesses within the wells 54. The wells 54 extend into block assembly 12. It will be noted that while both compression wells 24 and power wells 54 are disposed within block assembly 12, in order to clarify the illustration of FIG. 1 the respective power portions and compression portions of block assembly 12 are shaded differently. Each of the power followers is biased against the power rotor by a spring 58 extending between the power follower 53 and a spring recess 60 which extends into the block assembly 12. Each of the wells 54 communicates with an exhaust port 62 through which the products of the combustion process are appropriately withdrawn and exhausted.

When the incoming charge is compressed within a compression-combustion chamber 40, and the chamber 40 is completely sealed by adjacent full radius cam portions of both the compression rotor 20 and the power rotor 50, ignition takes place. Exact timing of ignition may be as desired. In the present embodiments, ignition may take place by means of a spark plug, if it is desired that the engine be used as a standard spark ignition engine, or combustion may take place by introducing a combustible fuel, as in a Diesel engine, if the present invention is desired to be operated in such a manner. While the perhaps most typical way in which this engine will be operated is by spark ignition, spark plugs have been omitted from FIG. 1 for clarity of illustration. Ignition preferably occurs during the overlap of the full radius portions of the compression and power rotors, which comprises about 6 to 8° of rotation.

After ignition has taken place, the leading edge of cam recess 52 presents itself and the expanding charge moves into the recess and against the power rotor. The expansion of the gases takes place until the entire volume of cam recess 52 is presented to the next forward well 54 and exhaust port 62. At the trailing edge of that next forward well 54 is power follower 53 which then bears against cam recess 52 to seal the leading edge of the power rotor in order to insure that the products of combustion are scavenged from cam recess 52 through the well 54 and its communicating exhaust port 62.

Immediately behind the compression-combustion chamber 40 in which the charge was ignited, with respect to the power rotor, is another power follower 53 which seals the trailing or lagging portion of the power rotor 50 in order to prevent the escape of the combusting gases. The trailing power follower 53 also serves to scavenge a previous burnt and expended charge out of cam recess 52 ahead of the incoming combusting charge.

With four intake ports and four exhaust ports, each with their respective followers and combustion chambers, and with two recesses per rotor, each located 180° from each other on the respective rotors, there are a total of eight power impulses or eight combustion strokes per revolution of the rotor.

FIG. 2 is a view of the apparatus of FIG. 1 taken substantially along line 2—2 of FIG. 1. The figure is partially broken away to show the relation between the rotors and the engine.

Shaft 16 is shown extending through the motor 10, and compression rotor 20 and power rotor 50 are shown disposed adjacent each other, and separated by a seal spacer 19. Block assembly 12 is closed by a pair of end cover plates 14. The rotors 20 and 50 are separated by a seal spacer 19 from each other and are sealed by a pair of seal spacers 17 which are disposed between the respective rotors and the end cover plates 14. Circular seal rings 15 are disposed between the block assembly 12 and the rotors 20 and 50 at seal spacers 17 and 19.

The relation between cam follower 23 and power follower 53 is illustrated in FIG. 2, with a compression-combustion chamber 40 extending between them. Exhaust port 62 is shown overlying power follower 53 and intake port 32 is overlying compression follower 23.

It will be noted that power rotor 50 is several times the width of compression rotor 20. The relative difference in width of the two rotors allows for the full utilization of the expansion of the gaseous charge at combustion. That is, if a charge is initially compressed to about 125 psi, and after the ignition the pressure rises to about 500 psi, or a pressure difference of about four to one, then the size of the power rotor with respect to the size of the compression rotor with their respective cam recesses, should be about four to one in order that the full power derived from the combustion process may be utilized in the power stroke.

FIG. 3 is an isometric view of the rotors of the present invention. Compression rotor 20 is shown adjacent power rotor 50, with a seal spacer 19 disposed between them. A pair of seal spacers 17 are disposed on the outer edges of the rotors. Shaft 16 extends diametrically through the rotors. Compression rotor 20 includes a pair of full radius cam portions 21 and a pair of cam recesses 22, of which only one may be seen in FIG. 3. Compression rotor seals 42 are disposed at the juncture of the cam recesses and the full radius cam portions to seal the respective areas of the rotor. Thus four rotor seals 42 are disposed on the periphery of compression rotor 20 and bear against the internal periphery of the stator and against the compression followers.

Similarly, power rotor 50 includes a pair of full radius cams 51, only one of which is shown in FIG. 3, and a pair of cam recesses 52. Rotor seals 64 are disposed between the full radius portions and the cam recesses. The overlap between the full radius cam portions of both compression rotor 20 and power rotor 50 are also illustrated in FIG. 3.

FIG. 4 comprises an isometric view of a power follower 53. The power followers 53 are substantially the same as compression followers 23 (see FIG. 1). Power follower 53 includes a head portion 70 and a web portion 72 extending between pivot pin 56 and the head 70. A wiper seal 73 is disposed in a matching groove in face 75 of head 70. A pair of side seals 74 are disposed also in matching grooves in sides 76 of the head 70. The wiper seals 73 provide necessary sealing action between the face 75 of each follower and the adjacent portion of the respective wells 54 (see FIG. 1) in which the followers are disposed, while the side seals 74 provide the necessary seals between the followers and the adjacent seal spacers 17 and 19 (see FIG. 3). The face 75 is curved on a radius substantially the same as that of the wells 54 in which the followers are disposed. Pivot pins 56 are cylindrical in form and provide the required bearing surfaces for the pivoting action of the followers as they are biased against the camming surface of the rotor into and out of their respective wells. If desired, special seals may also be used on the lower edges of the follower heads where the heads bear against the rotor surfaces.

FIG. 5 comprises an alternate embodiment of a power follower. A power rotor 150 is shown beneath a compression-combustion chamber 140. A power follower 153 is disposed within a well 154. the power follower 153 includes a pivot pin 156 and a head 170 with a web 172 extending therebetween. At the lower portion of the head 170 is a protruding lip 178 which extends into the compression-combustion chamber 140.

The force of a gaseous charge within the chamber 140 is shown by a plurality of arrows, with part of the force bearing directly against the lip 178 of the follower. The use of the lip provides additional sealing between the follower 153 and the rotor 150 to contain the combusting mixture within chamber 140. For clarity, the seals for the follower 153 have been omitted.

FIG. 6 discloses an alternate embodiment of a compression-combustion chamber 240. Power follower 253 is disposed within a well 254 and is shown pivoting on pivot pin 256 against rotor 250. The combustion chamber 240 includes a recessed or relieved portion 241 above the leading portion of rotor 250. The figure illustrates the use of the recessed portion 241 to utilize the explosive power of the combustion process to apply power at the beginning of the power stroke to the leading portion of the cam recess 252.

FIGS. 7–12 are successive views illustrating the operation of the present apparatus, but viewing the apparatus oppositely from that shown in FIGS. 1 and 2 so that the rotor appears to be rotating counterclockwise. FIG. 7 illustrates the beginning of the intake stroke in which an incoming charge moves into cam recess 22 of compression rotor 20 past a cam follower 23. The incoming charge is represented by the arrows. A spark plug 80 is shown extending into compression-combustion chamber 40. the rotation of compression rotor 20 is illustrated by the arrow on the rotor in each of the FIGS. 7-12. The next advanced compression follower 23a is shown bearing against full radius cam portion 21 of the compression rotor. a cam recess 52a of the adjacent power rotor is shown by dotted lines.

Figure 8:
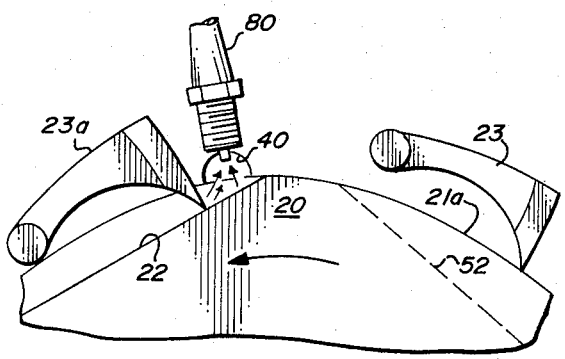

FIG. 8 illustrates the compression stroke in which the charge is compressed into the combustion-compression chamber 40 by rotation of rotor 20 and compression follower 23a disposed in cam recess 22. Compression follower 23 is now riding on full radius portion 21a of the compression rotor. The next succeeding cam recess 52 of the adjacent power rotor is shown by dotted lines.

Figure 9:
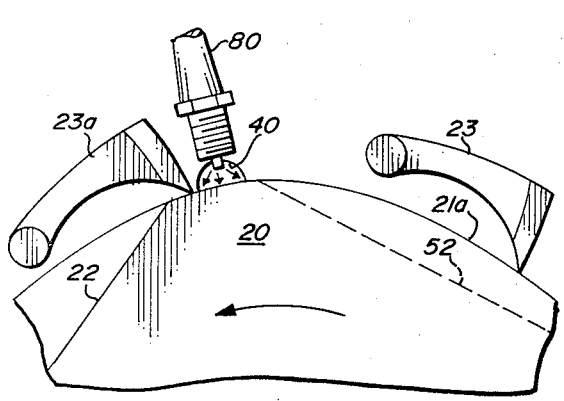

The completion of the compression stroke is illustrated in FIG. 9, wherein the compression followers 23 and 23a are both riding on full radius portion 21a of compression rotor 20. Cam recess 22 has advanced past compression follower 23a and the charge is now fully compressed and disposed within compression-combustion chamber 40. Since the charge is now fully compressed, ignition may now take place.

Figure 10:
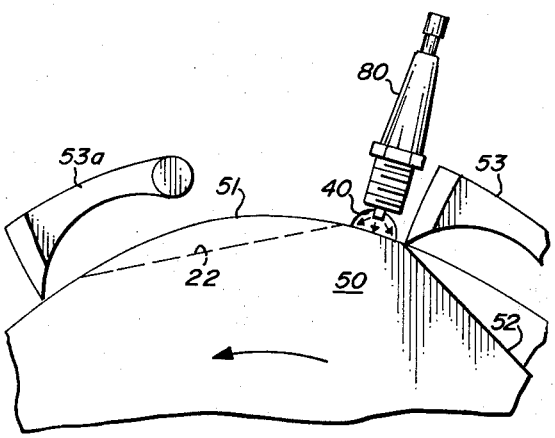
Figure 11:
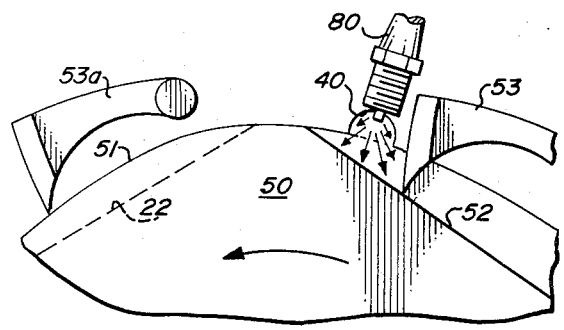
Figure 12:
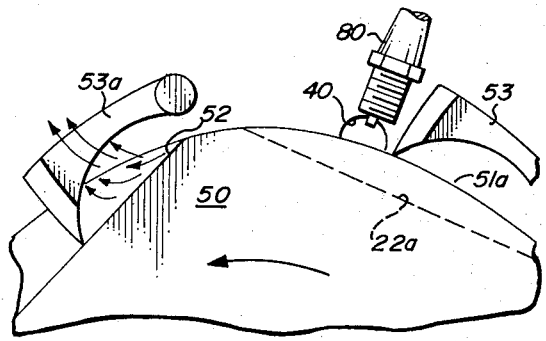

FIG. 10 shows a view similar to FIG. 9. The engine is rotated slightly clockwise in order that the power and exhaust sequences may be illustrated in the succeeding FIGS. 10–12. FIGS. 10–12 are taken looking at the power portion of the engine. Ignition is now taking place in FIG. 10 with the firing of spark plug 80 while the overlapping portions of the full radius cams of both the compression rotor and the power rotor are disposed beneath the compression-combustion chamber 40.

Power follower 53 is still riding on the full radius portion 51 of the power rotor 50. Power follower 53a is also riding on the full radius portion 51. Cam recess 52 is approaching the power follower 53 and the compression-combustion chamber 40. The cam recess 22 of the compression rotor is shown by dotted lines.

FIG. 11 illustrates the power stroke of the engine. Power follower 53 is now partially disposed within cam recess 52 of the power rotor 50 and the force of the combustion is now bearing against the leading portion of the cam recess. Power follower 53a is still disposed on the full radius portion 51 of the power rotor. Cam recess 22 of the compression rotor is again shown by dotted lines.

FIG. 12 illustrates the exhausting of the spent combustion products. Power follower 53 is now riding on full radius portion 51a of power rotor 50, while power follower 53 is disposed within cam recess 52 and the products of combustion are being scavenged from cam rececess 52 and out through an exhaust port. The products of combustion are illustrated by the arrows.

On the adjacent portion of the compression rotor, cam recess 22a, shown by dotted lines, is in its compression cycle since it is now disposed beneath the compression-combustion chamber 40.

Thus the complete intake, compression, ignition, power, and exhaust strokes have been successively illustrated, showing the cooperative elements of the rotary combustion engine in operation. As previously indicated, the engine may be operated in a Diesel mode rather than by spark ignition if so desired by merely adjusting the compression ratio as desired. It may be seen that the engine is simple in operation, with a minimum of moving parts, and is at all times in dynamic balance with respect to the forces acting on the engine since they are opposite to each other as the engine goes through each cycle. Moreover, the rotors are fully supported in the block assembly on bearings throughout the complete rotation of the rotors.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted for specific environments and operating requirements, without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. A rotary internal combustion engine, comprising, in combination:
   stator means;
   first motor means in said stator means;
   second motor means in said stator means;
   said first and second rotor means each including a full radius cam portion and a cam recess portion;
   a shaft journalled for rotation in said stator means, said first and said second rotor means being secured to said shaft to rotate therewith;
   compression-combustion chamber means in the inner periphery of said stator means extending between the first rotor means and the second rotor means;
   intake port means in said stator means communicating with said first rotor means for admitting a gaseous mixture into the cam recess portion of said first rotor means;
   means for compressing said gaseous mixture into said compression-combustion chamber as the first rotor means rotates in said stator;
   means for igniting the gaseous mixture in said compression-combustion chamber;
   means for transferring the gaseous mixture from said compression-combustion chamber to the second rotor means for deriving power from the gaseous mixture; and
   exhaust port means in said stator means communicating with said second rotor means for exhausting the gaseous mixture from said second rotor means in response to movement of the second rotor means.

2. The apparatus of claim 1 in which the means for compressing said gaseous mixture into said compression-combustion chamber includes a first cam follower disposed in said stator means adjacent the compression combustion chamber and sealingly engaging the stator means and the cam portions of the rotor means.

3. The apparatus of claim 2 in which the means for transferring the gaseous mixture from the compression-combustion chamber to said second rotor means comprises the axial alignment of the respective full radius cam portion and cam recess portion of the first and second rotor means, said full radius cam portion of said first rotor means disposed in axial alignment adjacent the cam recess portion of said second rotor means, and the cam recess portion of the first rotor means disposed in axial alignment adjacent the full radius portion of the second rotor means.

4. The apparatus of claim 3 in which the stator means includes means for transferring the gaseous mixture from said second rotor means to said exhaust port means includes a second cam follower disposed in said stator means and sealingly engaging said stator means and said second rotor means to urge said gaseous mixture to said exhaust port means.

5. The apparatus of claim 4 in which the first and second cam followers are pivoted in said stator means and are each biased against the respective rotors by a compression spring.

6. The apparatus of claim 5 in which the full radius cam portions of the first and the second rotor means overlap each other.

7. A rotary internal combustion engine, comprising, in combination;
   stationary housing means;
   a shaft rotable in said housing means;
   first rotor means in said housing secured to said shaft;
   intake port means in said housing means communicating with said first rotor;
   recess means in said first rotor for receiving a combustible charge through said intake port;
   second rotor means in said housing secured to said shaft and rotable therewith;
   chamber means in said housing means on the inner periphery thereof communicating between the first rotor means and the second rotor means;
   means for compressing the gaseous mixture from said recess means on the first rotor means into the chamber means;
   means for igniting the compressed gaseous mixture in the chamber means;
   recess means on the second rotor means to receive the ignited gaseous mixture from the chamber between the first rotor and the second rotor for providing an output from the ignited gaseous mixture;
   exhaust port means in the housing means communicating with the recess means on the second rotor means; and
   means for transferring the gaseous mixture from said recess on said second rotor means to the exhaust port.

8. The apparatus of claim 7 in which the means for compressing the gaseous mixture from the recess means on the first rotor means into the chamber includes full radius cam means on the first rotor means adjacent the recess means, and cam follower means pivotally secured to the stationary housing means and sealingly engaging the housing means and the first rotor means adjacent the chamber means for urging the gaseous mixture from the recess means into the chamber means.

9. The apparatus of claim 8 in which the means for withdrawing the gaseous mixture from the recess means on the second rotor means includes full radius cam means on the second rotor means disposed adjacent the recess means, and cam follower means pivotally secured to the stationary housing means and sealingly engaging the housing means and the second rotor means adjacent the exhaust port to urge the gaseous mixture out of the recess means and into the exhaust port means.

10. The apparatus of claim 9 in which the recess means and the full radius cam means on first and second rotor means each include a pair of full radius cam portions and a pair of cam recess portions, the cam recess portions and the full radius cam portions being disposed alternately on said rotors.

11. The apparatus of claim 10 in which the full radius cam portions of said first rotor means are disposed in axial alignment adjacent the cam recess portions of said second rotor means, and the cam recess portions of the first rotor means are disposed in axial alignment adjacent the full radius cam portions of the second rotor means.

12. The apparatus of claim 11 in which the intake port means includes a plurality of intake ports and the exhaust port means includes a plurality of exhaust ports.

13. The apparatus of claim 11 in which the cam follower means includes a plurality of cam followers each disposed in the housing means in a spaced apart relationship about the periphery of said first and said second rotor means and the cam followers are biased against the said rotor means.

14. The apparatus of claim 13 in which a cam follower is disposed adjacent each intake port and each exhaust port.

* * * * *